(12) United States Patent
De Luca (10) Patent No.: US 11,608,100 B2
(45) Date of Patent: Mar. 21, 2023

(54) WHEELBARROW BRAKING ASSEMBLY (71) Applicant: Michael De Luca, Latrobe, PA (US)

(72) Inventor: Michael De Luca, Latrobe, PA (US)

( * ) Notice: Subject to any disclaimer, the term of this patent is extended or adjusted under 35 U.S.C. 154(b) by 241 days.

(21) Appl. No.: 17/064,379

(22) Filed: Oct. 6, 2020

(65) Prior Publication Data
US 2022/0105974 A1 Apr. 7, 2022

(51) Int. Cl.
*B62B 5/04* (2006.01)
*B62B 1/18* (2006.01)

(52) U.S. Cl.
CPC ............ *B62B 5/0447* (2013.01); *B62B 1/18* (2013.01); *B62B 2005/0471* (2013.01)

(58) Field of Classification Search
CPC ..... B62B 5/0447; B62B 5/0433; B62B 5/049; B62B 5/04; B62B 5/0438; B62B 2005/0471; B62B 1/00; B62B 1/18
See application file for complete search history.

(56) References Cited

U.S. PATENT DOCUMENTS

| | | | | |
|---|---|---|---|---|
| 3,092,418 A * | 6/1963 | Themascus | ............... | B62B 1/24 298/3 |
| 3,098,573 A * | 7/1963 | Wise | ........................ | B62B 1/18 414/460 |
| 3,715,015 A * | 2/1973 | Morris | ..................... | B62B 5/049 248/354.6 |
| 4,479,658 A | 10/1984 | Michaux | | |
| 4,962,833 A * | 10/1990 | McCurdy | ................ | B62B 5/068 188/114 |
| 5,690,191 A * | 11/1997 | Burbank | ................... | B62B 5/04 188/26 |
| 6,443,267 B1 * | 9/2002 | Burbank | ................... | B62B 5/04 188/19 |
| 6,886,838 B1 * | 5/2005 | Zimmerman | ............. | B62B 1/22 298/3 |
| 6,991,251 B2 * | 1/2006 | Tomchak | ................ | B62B 1/206 280/654 |
| 7,134,675 B2 * | 11/2006 | Carosi | ....................... | B62B 1/22 280/47.31 |
| 7,147,234 B2 * | 12/2006 | Davis | ........................ | B62B 1/18 280/47.131 |
| 7,748,723 B2 | 7/2010 | Jimenez | | |
| 8,235,153 B2 * | 8/2012 | Robinson | ................ | B60L 50/66 180/19.3 |
| 8,523,198 B2 | 9/2013 | Albert | | |
| 11,167,782 B1 * | 11/2021 | MacKarvich | .......... | B62B 5/049 |
| 2003/0015852 A1 | 1/2003 | Swift | | |
| 2004/0164509 A1 | 8/2004 | Campbell | | |

FOREIGN PATENT DOCUMENTS

WO WO0209997 2/2002

* cited by examiner

Primary Examiner — James M Dolak (57) ABSTRACT

A wheelbarrow braking assembly for slowing or stopping a wheelbarrow includes a brake rotor that is attachable to a wheel of a wheelbarrow. A caliper is mountable to the wheelbarrow such that the caliper is aligned with the brake rotor for slowing or stopping the wheelbarrow. A brake handle is provided that is mountable adjacent to an end of a respective rail of the wheelbarrow. In this way the brake handle is accessible to the user when the user is maneuvering the wheelbarrow. The brake handle is in mechanical communication with the caliper and the caliper is engaged when the brake handle is squeezed.

8 Claims, 7 Drawing Sheets

WHEELBARROW BRAKING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to braking devices and more particularly pertains to a new braking device for slowing or stopping a wheelbarrow.

(2) Description of Related Art Including Information Disclosed Under 37 CFR 1.97 and 1.98

The prior art relates to braking devices including a variety of wheelbarrows that includes a drum braking system. The prior art discloses a wheelbarrow retro fit assembly that includes a pair of rear wheels and a cable actuated parking brake. The prior art discloses a retro fit assembly for mounting a disk braking system onto a wheelbarrow.

BRIEF SUMMARY OF THE INVENTION

An embodiment of the disclosure meets the needs presented above by generally comprising a brake rotor that is attachable to a wheel of a wheelbarrow. A caliper is mountable to the wheelbarrow such that the caliper is aligned with the brake rotor for slowing or stopping the wheelbarrow. A brake handle is provided that is mountable adjacent to an end of a respective rail of the wheelbarrow. In this way the brake handle is accessible to the user when the user is maneuvering the wheelbarrow. The brake handle is in mechanical communication with the caliper and the caliper is engaged when the brake handle is squeezed.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
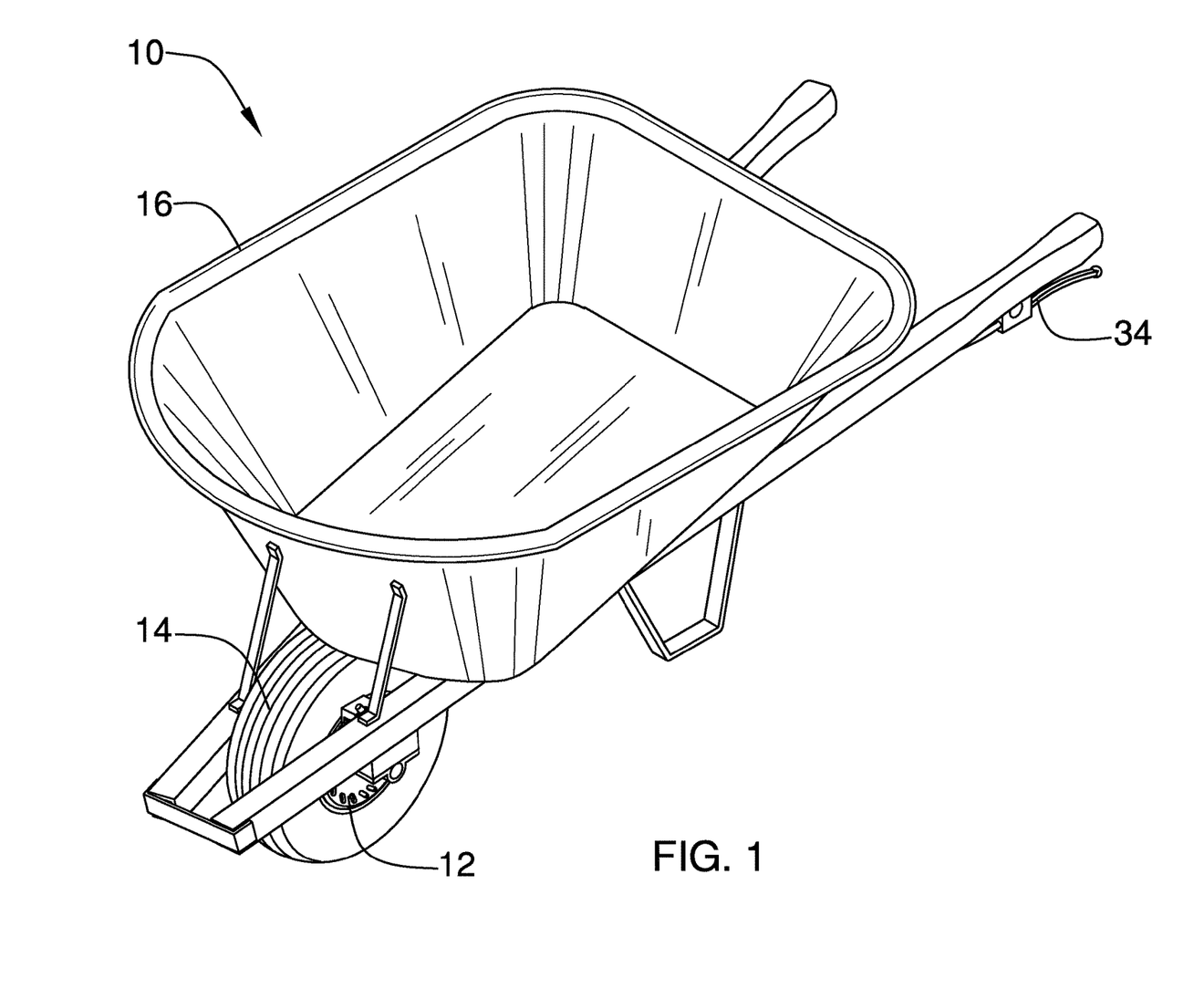
FIG. 1 is a perspective view of a wheelbarrow braking assembly according to an embodiment of the disclosure.
Figure 2:
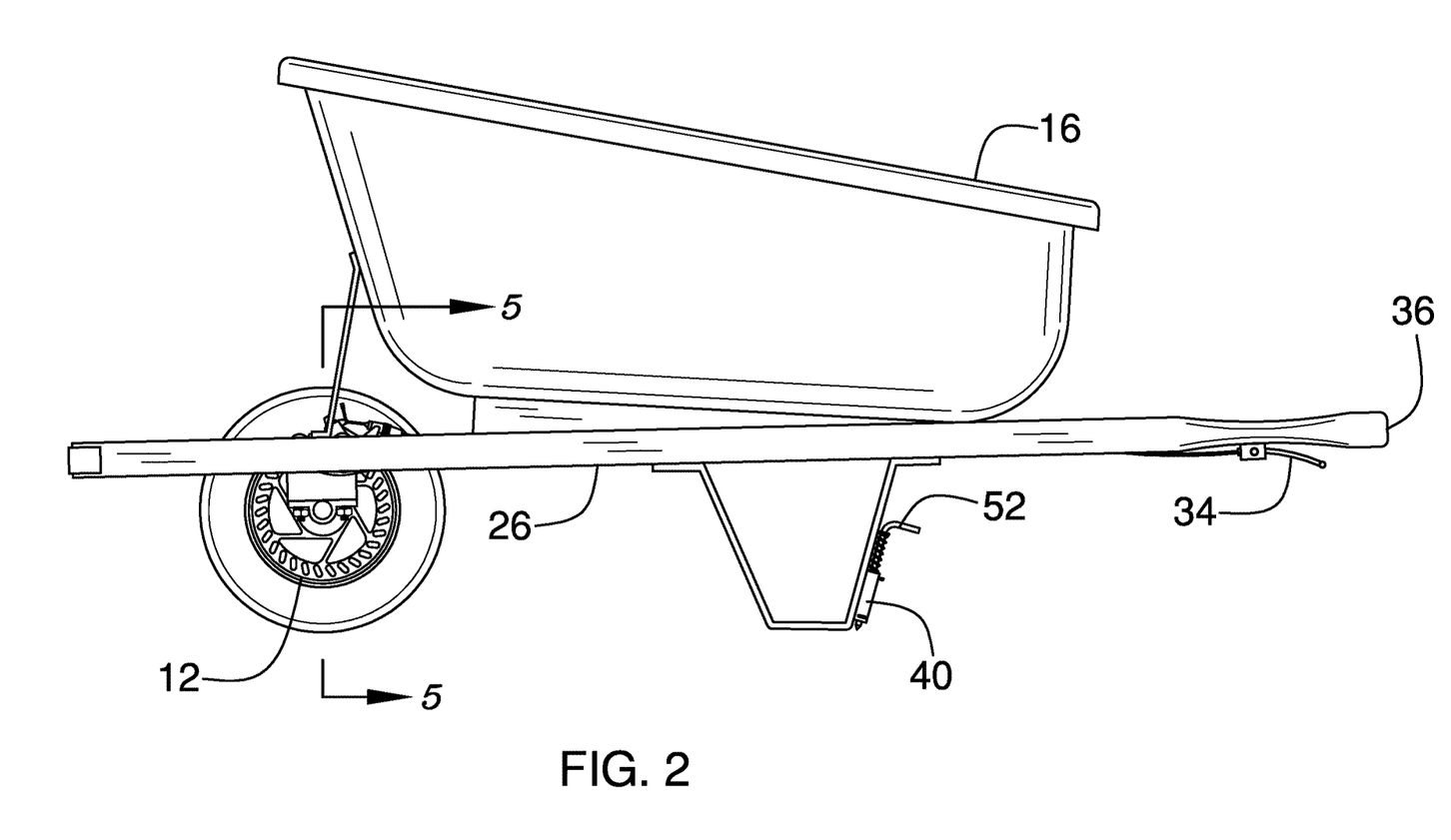
FIG. 2 is a left side view of an embodiment of the disclosure.
Figure 3:
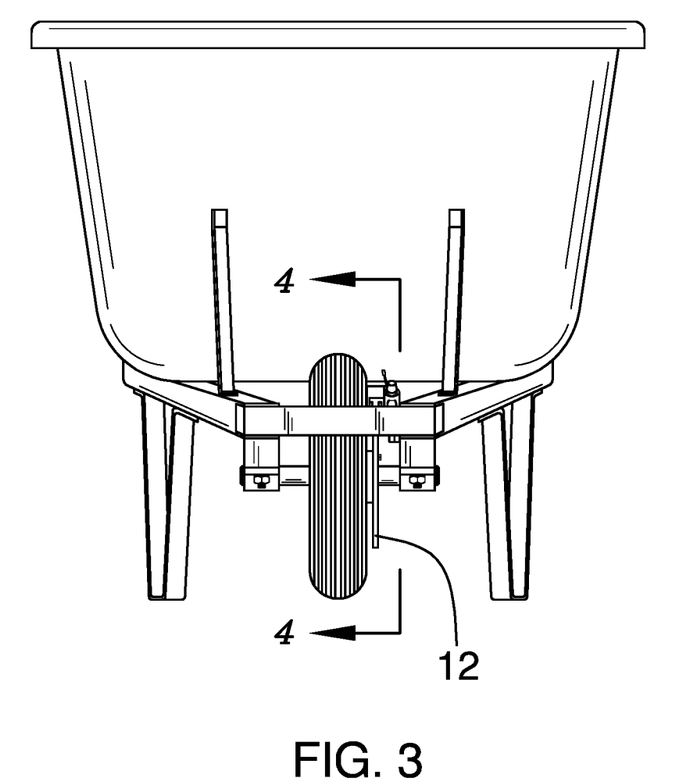
FIG. 3 is a front view of an embodiment of the disclosure.
Figure 4:
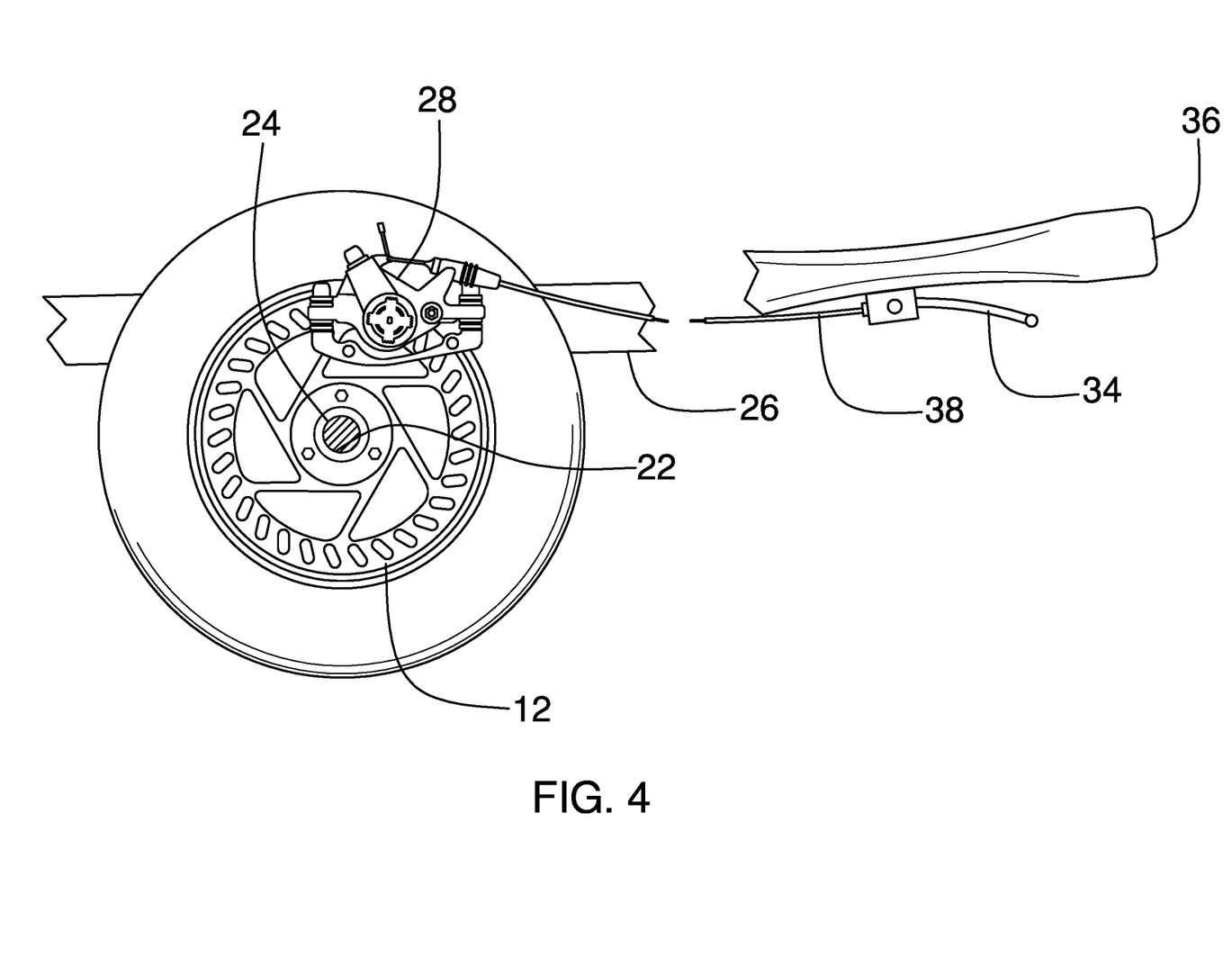
FIG. 4 is a detail view of a brake rotor and a brake handle of an embodiment of the disclosure.
Figure 5:
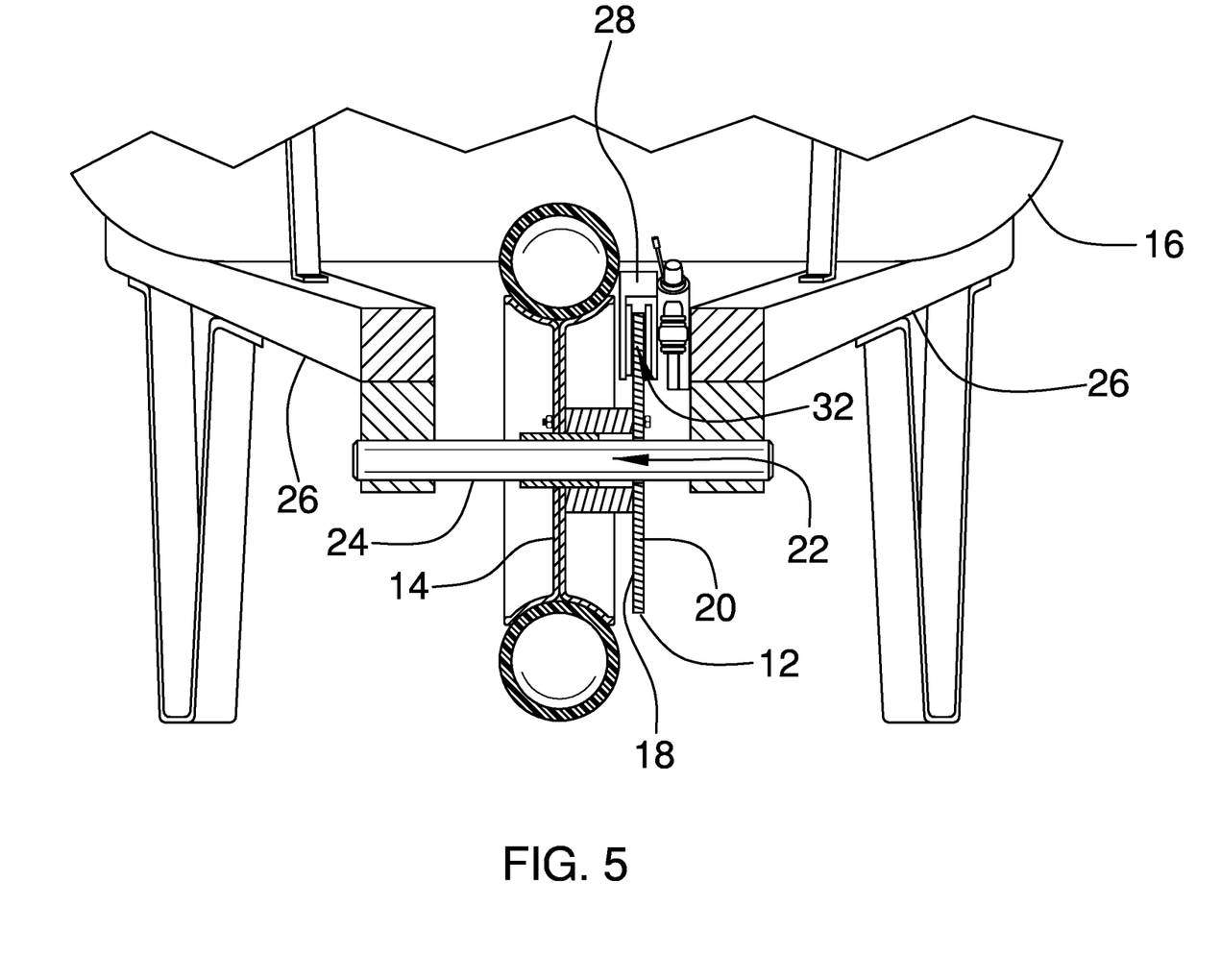
FIG. 5 is a cross sectional view taken along line 5-5 of FIG. 2 of an embodiment of the disclosure.
Figure 6A:
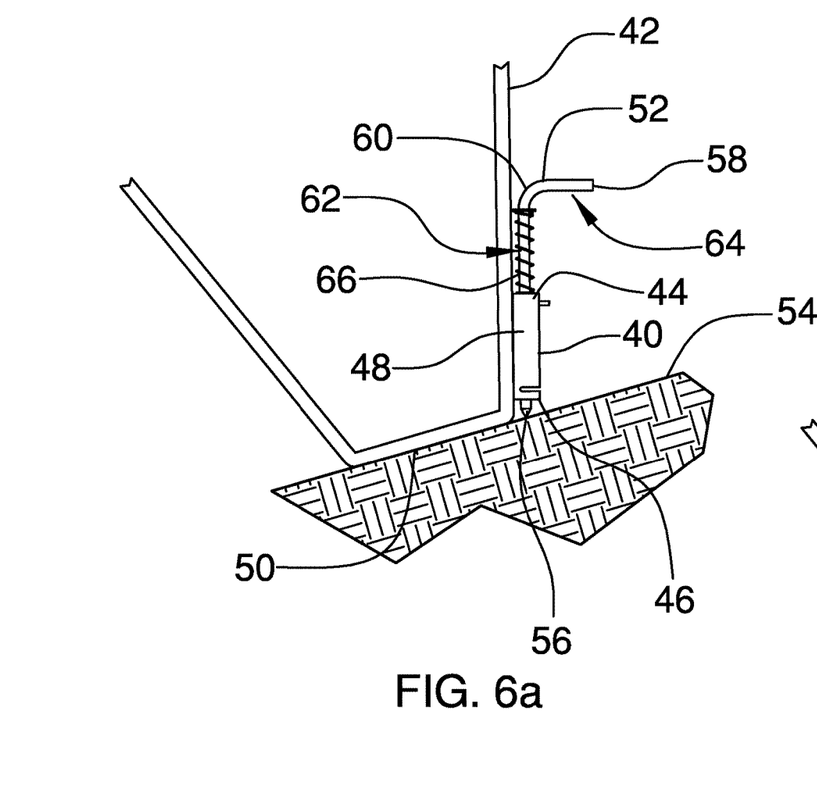
FIG. 6a is a perspective view of a pin of an embodiment of the disclosure being positioned in a stored position.
Figure 6B:
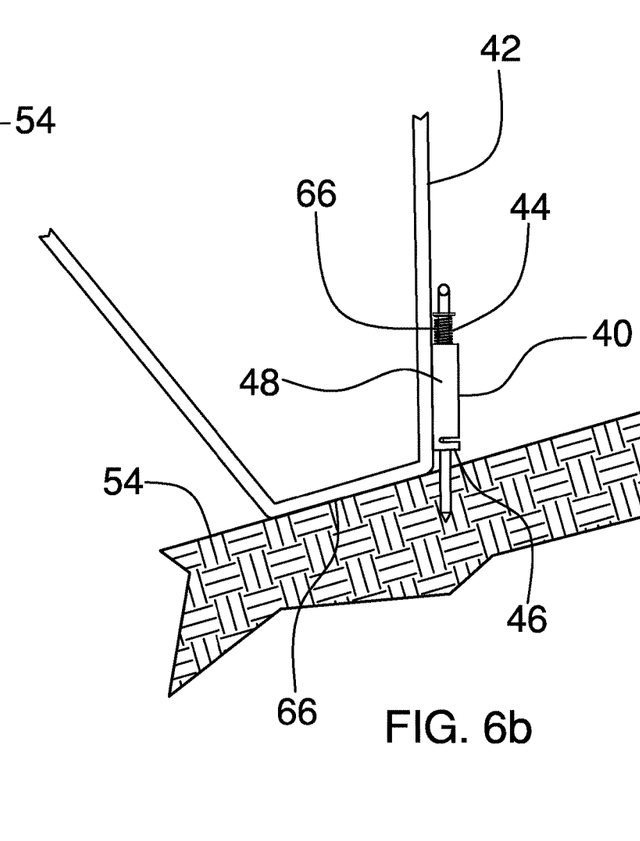
FIG. 6b is a perspective view of a pin of an embodiment of the disclosure being positioned in a deployed position.
Figure 7:
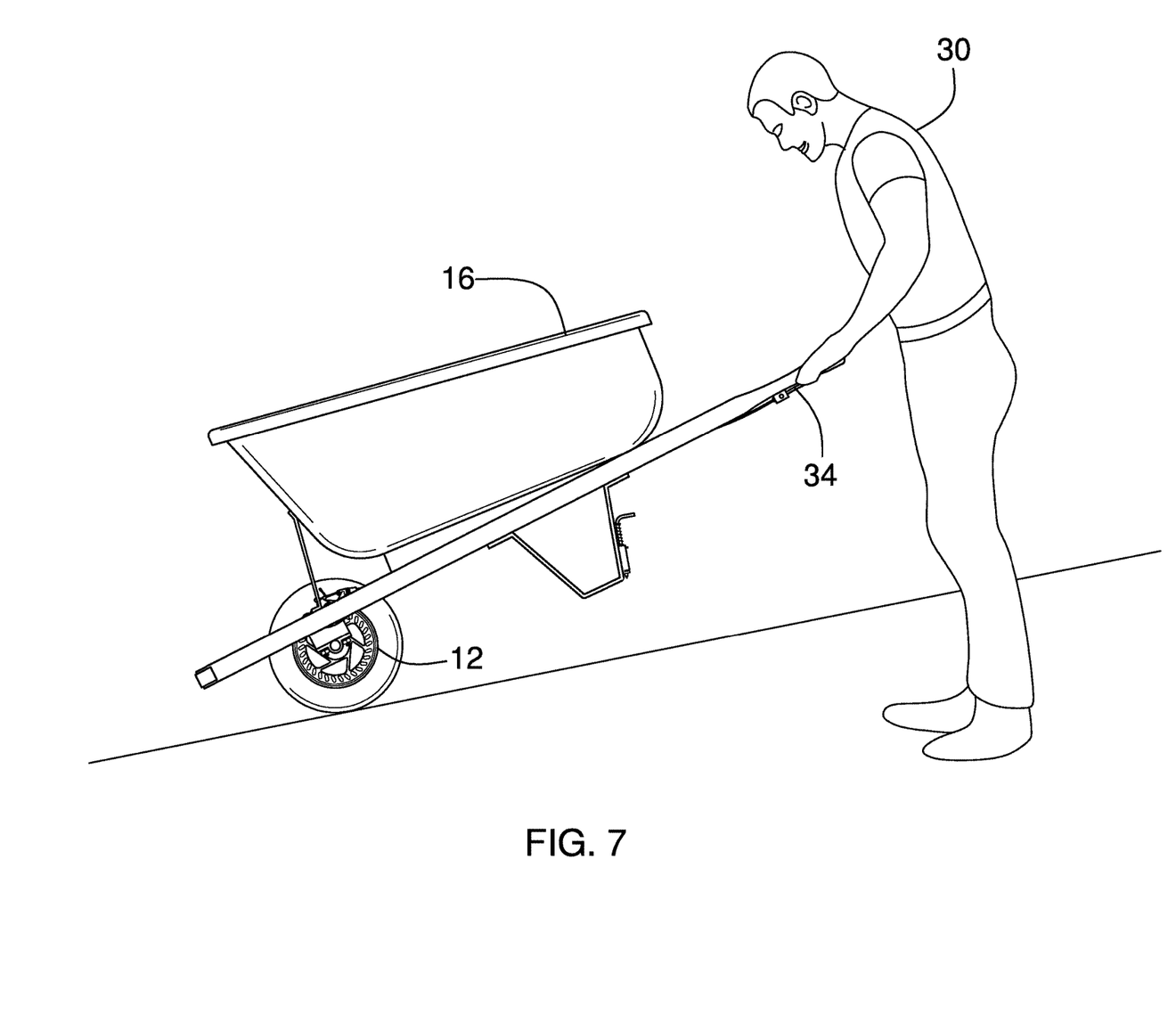
FIG. 7 is a perspective in-use view of an embodiment of the disclosure.

With reference now to the drawings, and in particular to FIGS. 1 through 7 thereof, a new braking device embodying the principles and concepts of an embodiment of the disclosure and generally designated by the reference numeral 10 will be described.

As best illustrated in FIGS. 1 through 7, the wheelbarrow braking assembly 10 generally comprises a brake rotor 12 that is attachable to a wheel 14 of a wheelbarrow 16. The brake rotor 12 has a first surface 18 and a second surface 20, and the brake rotor 12 has an axle opening 22 extending through the first surface 18 and the second surface 20. The axle opening 22 is centrally positioned on the brake rotor 12 and the axle opening 22 has an axle 24 of the wheelbarrow 16 extending therethrough. Thus, the brake rotor 12 is positioned between the wheel 14 of the wheelbarrow 16 and a respective one of a pair of rails 26 of the wheelbarrow 16. The wheelbarrow 16 may be a wheelbarrow of any conventional design and dimensions.

A caliper 28 is mountable to the wheelbarrow 16 such that the caliper 28 is aligned with the brake rotor 12. The caliper 28 frictionally engages the brake rotor 12 when the caliper 28 is engaged for slowing or stopping the wheelbarrow 16. In this way the caliper 28 assists a user 30 with maneuvering the wheelbarrow 16 down an incline or to stop the wheelbarrow 16. The brake rotor 12 freely rotates when the caliper 28 is disengaged. The caliper 28 is mountable to the rail 26 of the wheelbarrow 16 that is positioned adjacent to the brake rotor 12 having the brake rotor 12 passing through a rotor slot 32 in the caliper 28. The caliper 28 may be a mechanical brake caliper or the like that may include brake pads that squeeze against the brake rotor 12 when the caliper 28 is engaged.

A brake handle 34 is provided and the brake handle 34 is mountable adjacent to an end 36 of a respective rail 26 of the wheelbarrow 16. In this way the brake handle 34 is accessible to the user 30 when the user 30 is maneuvering the wheelbarrow 16 thereby facilitating the user 30 to squeeze the brake handle 34. The brake handle 34 is urgeable into a braking position and the brake handle 34 is biased into a non-braking position. A cable 38 is coupled between the brake handle 34 and the caliper 28 such that the brake handle 34 is in mechanical communication with the caliper 28. The caliper 28 is engaged when the brake handle 34 is urged into the braking position for slowing or stopping the wheelbarrow 16. Conversely, the caliper 28 is disengaged when the brake handle 34 is biased into the non-braking position.

A sleeve 40 is provided and the sleeve 40 is attachable to a stand 42 of the wheelbarrow 16. The sleeve 40 has a top end 44, a bottom end 46 and an outer wall 48 extending therebetween. The outer wall 48 is attachable to the stand 42 having the bottom end 46 being positioned adjacent to a bottom 50 of the stand 42. A pin 52 is provided and the pin 52 slidably extends through the sleeve 40. The pin 52 is positionable in a deployed position to engage a support surface 54 upon which the wheelbarrow 16 is being rolled thereby inhibiting the wheelbarrow 16 from moving. Conversely, the pin 52 is positionable in a retracted position to be disengaged from the support surface 54.

The pin 52 has a first end 56 and a second end 58, and the first end 56 tapers to a point to penetrate the support surface 54. The pin 52 has a bend 60 positioned adjacent to the second end 58 thereby defining a first portion 62 of the pin 52 forming an angle with a second portion 64 of the pin 52, and the first portion 62 extends through the sleeve 40. A biasing member 66 is provided and the biasing member 66 is positioned around the pin 52. The biasing member 66 extends between the top end 44 of the sleeve 40 and the second portion 64 of the pin 52 for biasing the pin 52 into the retracted position.

In use, the brake handle 34 is squeezed to engage the caliper 28 for slowing or stopping the wheelbarrow 16. In this way the user 30 is assisted with maneuvering the wheelbarrow 16 down a slope without losing control of the wheelbarrow 16. Additionally, the brake handle 34 can be squeezed to assist the user 30 with bringing the wheelbarrow 16 to a stop. The pin 52 can be extended into the deployed position to retain the wheelbarrow 16 at a stop while the wheelbarrow 16 is being loaded or unloaded.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A wheelbarrow braking assembly for retrofitting on a wheelbarrow thereby facilitating a user to stop or slow the wheelbarrow, said assembly comprising:
   a brake rotor being attachable to a wheel of the wheelbarrow;
   a caliper being mountable to the wheelbarrow such that said caliper is aligned with said brake rotor, said caliper frictionally engaging said brake rotor when said caliper is engaged for slowing or stopping the wheelbarrow, said brake rotor freely rotating when said caliper is disengaged;
   a brake handle being mountable adjacent to an end of one of a pair of rails of the wheelbarrow, said brake handle being in mechanical communication with said caliper, said caliper being engaged when said brake handle is squeezed;
   a sleeve being attachable to a stand of the wheelbarrow, said sleeve having a top end, a bottom end and an outer wall extending therebetween; and
   a pin being slidably mounted to said sleeve, said pin having first end and a second end, said pin tapering to a point at said first end, said pin being positionable in a retracted position and a deployed position, wherein said first end moves downwardly away from said sleeve when said pin moves from said retracted position to said deployed position.

2. The assembly according to claim 1, wherein said brake rotor has a first surface and a second surface, said brake rotor having an axle opening extending through said first surface and said second surface, said axle opening being centrally positioned on said brake rotor, said axle opening having an axle of the wheelbarrow extending therethrough.

3. The assembly according to claim 1, wherein:
   said brake handle is urgeable into a braking position, said brake handle being biased into a non-braking position; and
   said assembly includes a cable being coupled between said brake handle and said caliper such that said brake handle is in mechanical communication with said caliper, said caliper being engaged when said brake handle is urged into said braking position for slowing or stopping the wheelbarrow, said caliper being disengaged when said brake handle is biased into said non-braking position.

4. The assembly according to claim 1, said outer wall of said sleeve being attachable to the stand such that said bottom end is positioned adjacent to a bottom of the stand.

5. The assembly according to claim 4, wherein said pin is at least partially enclosed within said sleeve, said first end of said pin being enclosed within said sleeve when said pin is in said retracted position.

6. The assembly according to claim 5, said pin having a bend being positioned adjacent to said second end thereby defining a first portion of said pin and a second portion of said pin, said first portion being fully enclosed within said sleeve when said pin is in said retracted position, said second portion extending laterally away from said sleeve.

7. The assembly according to claim 6, further comprising a biasing member being positioned around said pin, said biasing member extending between said top end of said sleeve and said second portion of said pin for biasing said pin into said retracted position.

8. A wheelbarrow braking assembly for retrofitting on a wheelbarrow thereby facilitating a user to stop or slow the wheelbarrow, said assembly comprising:

a brake rotor being attachable to a wheel of the wheelbarrow, said brake rotor having a first surface and a second surface, said brake rotor having an axle opening extending through said first surface and said second surface, said axle opening being centrally positioned on said brake rotor, said axle opening having an axle of the wheelbarrow extending therethrough;

a caliper being mountable to the wheelbarrow such that said caliper is aligned with said brake rotor, said caliper frictionally engaging said brake rotor when said caliper is engaged for slowing or stopping the wheelbarrow, said brake rotor freely rotating when said caliper is disengaged;

a brake handle being mountable adjacent to an end of one of a pair of rails of the wheelbarrow, said brake handle being urgeable into a braking position, said brake handle being biased into a non-braking position, said brake handle being positioned below said one of said pair of rails;

a cable being coupled between said brake handle and said caliper such that said brake handle is in mechanical communication with said caliper, said caliper being engaged when said brake handle is urged into said braking position for slowing or stopping the wheelbarrow, said caliper being disengaged when said brake handle is biased into said non-braking position;

a sleeve being attachable to a stand of the wheelbarrow, said sleeve having a top end, a bottom end and an outer wall extending therebetween, said outer wall being attachable to the stand having such that said bottom end is positioned adjacent to a bottom of the stand;

a pin being slidably mounted to said sleeve, said pin having first end and a second end, said pin tapering to a point at said first end, said pin being positionable in a retracted position and a deployed position, wherein said first end moves downwardly away from said sleeve when said pin moves from said retracted position to said deployed position, wherein said pin is at least partially enclosed within said sleeve, said first end of said pin being enclosed within said sleeve when said pin is in said retracted position, said pin having a bend being positioned adjacent to said second end thereby defining a first portion of said pin and a second portion of said pin, said first portion being fully enclosed within said sleeve when said pin is in said retracted position, said second portion extending laterally away from said sleeve; and a biasing member being positioned around said pin, said biasing member extending between said top end of said sleeve and said second portion of said pin for biasing said pin into said retracted position.

* * * * *